United States Patent
Stamenkovic

(10) Patent No.: US 6,694,278 B1
(45) Date of Patent: Feb. 17, 2004

(54) METHOD AND DEVICE FOR COMPENSATING THE TRANSMISSION BEHAVIOR OF A MEASURING, REGULATING OR CONTROL DEVICE

(75) Inventor: Milan Stamenkovic, Gerlingen (DE)

(73) Assignee: Stotz-Feinmesstechnik GmbH, Gerlingen (DE)

( * ) Notice: Subject to any disclaimer, the term of this patent is extended or adjusted under 35 U.S.C. 154(b) by 0 days.

(21) Appl. No.: 10/069,281
(22) PCT Filed: Aug. 25, 2000
(86) PCT No.: PCT/EP00/08306
§ 371 (c)(1), (2), (4) Date: Apr. 16, 2002
(87) PCT Pub. No.: WO01/14828
PCT Pub. Date: Mar. 1, 2001

(30) Foreign Application Priority Data
Aug. 25, 1999 (DE) .......................................... 199 40 401

(51) Int. Cl.$^7$ ............................................. G01B 13/02
(52) U.S. Cl. ......................................... 702/105; 73/37.5
(58) Field of Search .......................... 702/105; 73/37.5, 73/37.6, 37.8; 264/40.5; 33/837

(56) References Cited

U.S. PATENT DOCUMENTS 5,213,726 A  5/1993  Ramsey et al. ............ 264/40.5

FOREIGN PATENT DOCUMENTS

| DE | 29 21 989 A | 12/1980 |
| DE | 42 00 401 A | 7/1993 |
| DE | 197 33 984 A 1 | 2/1999 |

Primary Examiner—Kamini Shah
(74) Attorney, Agent, or Firm—Gifford, Krass, Groh, Sprinkle, Anderson & Citkowski, P.C.

(57) ABSTRACT

The present invention relates to a method for compensating the transmission behavior of a measuring, regulating or control device wherein the output values of the device are modified by correction factor which is approximately determined for the associate input values in accordance with the transmission behavior of the device. A compensating circuit operates to provide first order differentiation of an output signal delivered from the device a plurality of times until a desired correction of the output signal has been absolved.

19 Claims, 2 Drawing Sheets

METHOD AND DEVICE FOR COMPENSATING THE TRANSMISSION BEHAVIOR OF A MEASURING, REGULATING OR CONTROL DEVICE

FIELD OF THE INVENTION

The present invention relates to a method for compensating the transmission behavior of a measuring, regulating or control device, in particular of a dynamic length measuring system in accordance with the high pressure measurement method, in which the output values of the arrangement are modified by a correction function which is approximately determined for the associated input values in accordance with the transmission behavior of the arrangement.

BACKGROUND OF THE INVENTION

It is known that measuring, regulating and control arrangements have a transmission behavior. The output value in particular lags behind the input value due to the inertia of the said arrangements. This means that the output value only reaches the value of the input value after a certain start-up time. This leads to fast, dynamic measurements not being able to be carried out.

It is therefore known to compensate the transmission behavior of such arrangements in that a function inverse to the transmission function is applied to the output value. The transmission function is usually approximately described as a differential equation for this, whose order depends on the respective arrangement. It is a problem that differential equations of a higher order cannot be realized, or can only be realized at great cost and complexity, from a technical circuit aspect. The compensation of the transmission behavior of such an arrangement is correspondingly complicated.

SUMMARY OF THE INVENTION

It is the underlying object of the invention to provide an improved method of the kind initially named and an apparatus for the carrying out of the method. The compensation should in particular be able to be realized more easily.

This object is satisfied in that a linear differential equation of the first order is used as the approximated correction function and in that the output values are modified by this correction function several times in succession by the modified output value again being modified, and so forth.

The idea of the invention therefore consists of always only using differential equations of the first order for compensating the transmission behavior, irrespective of the kind of arrangement and of its transmission behavior, and to carry out this compensation so often in the manner of an iteration process that a desired degree of compensation or a desired acceleration of the measurement, that is time until the reaching of the end value, is achieved. For example, a differential equation of the fourth order of a conventional method is replaced by using a differential equation of the first order four times on the starting values to obtain the same degree of compensation. The inverse transmission function can thus be easily realized from a technical circuit aspect. Since, moreover, a repeated use of this circuit is unproblematic, the compensation overall is not complicated.

In accordance with an embodiment of the invention, the correction function has the following form:

$$S'(t) = S(t) + k \times \frac{dS(t)}{dt},$$

where S(t) is the value to be modified, S'(t) is the modified value and k is a constant. In this connection, a separate constant k is preferably fixed for each correction step. A very good and fast adaptation of the output value to the input value can be achieved with this function and the fixing of independent constants k for each correction step.

It is preferred for the constant k to be determined such that as few correction steps as possible are required for the desired correction. The compensation circuit is thereby simplified and the process accelerated.

In accordance with a further embodiment in accordance with the invention, suitable constants k are determined for the correction steps by trials. It has been found that very good results can be achieved in this manner.

In accordance with a further embodiment in accordance with the invention, the constants k for the correction steps are determined automatically. This means that the constants k are varied for so long by a routine to be determined until they deliver an optimum result.

In accordance with a further embodiment of the invention, the modified values are directed through an attenuation member, in particular a low pass filter, in the final correction step. An overshooting of the corrected value over the actual value is hereby avoided.

In accordance with a further embodiment of the invention, the end value of the correction is averaged over a time interval. Noise occurring due to the attenuation or for another reason can be compensated in this way.

It is preferred if the averaging of the end value is begun after a fixable start-up time. It can thus be ensured that the end value has already stabilized sufficiently.

In accordance with a further embodiment of the invention, the averaging is begun in response to a signal which can be delivered to the system from outside. In this way, the possibility is provided of starting averaging individually and in particular in dependence on external parameters.

An apparatus for carrying out of method in accordance with claim 1 has the features set forth in claim 11, moreover, optionally, means for attenuating the modified value, in particular a low pass filter, and means for averaging the end value of the modification as well as means for outputting the corrected value. The apparatus is preferably designed such that the number of correction steps can be adjusted. The precision and the acceleration of the correction process can thus be selected.

In accordance with a further embodiment of the invention, the point in time of the averaging can be adjusted. In accordance with yet another embodiment of the invention, the degree of attenuation, in particular the limiting value of the low pass filter, can be adjusted.

The method in accordance with the invention and the apparatus in accordance with the invention are preferably used in length measurements in accordance with the high pressure measurement method which work with a measuring nozzle and a front nozzle and with a pressure sensor in front of the front nozzle and a pressure sensor between the front nozzle and the measuring nozzle, that is without the otherwise usual bridge circuit. In such a method and apparatus, known for example from DE 197 33 984 A1, the problem often occurs that the pressure sensors are relatively far away from the measuring nozzle, since there is not sufficient room present for this in the proximity of the measuring nozzle. The response time of the measuring arrangement is therefore correspondingly long.

The response time can be compensated in a simple and skilled manner by the method in accordance with the invention and by the apparatus in accordance with the invention so that such measurements can be accelerated with a comparatively small effort. Fast dynamic length measurements thus become possible.

BRIEF DESCRIPTION OF THE DRAWINGS

An embodiment of the invention is represented in the drawing and will be described in the following. There are shown, in each case in a schematic representation.

DETAILED DESCRIPTION OF THE INVENTION

Figure 1:
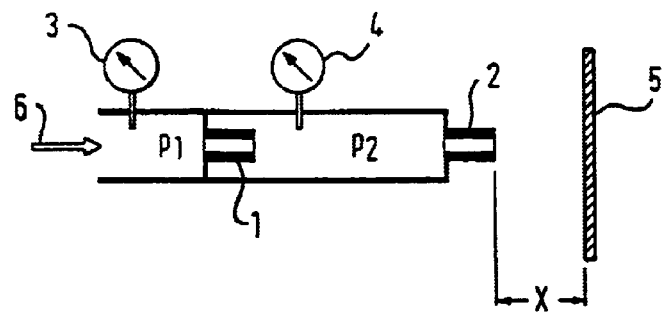
FIG. 1 the basic principle of a pneumatic length measurement without a bridge circuit.

FIG. 1 shows the basic set-up of a measuring arrangement for the carrying out of a pneumatic length measurement such as is described in DE 197 33 984 A1. The measuring arrangement shown includes a front nozzle 1, a measuring nozzle 2, a first pressure sensor 3 arranged in front of the front-nozzle 1 and a second pressure sensor 4 arranged between the front nozzle 1 and the measuring nozzle 2. A deflection plate 5 representative of a work piece to be measured is shown in front of the air outlet opening of the measuring nozzle 2.

Compressed air is delivered to the system in accordance with arrow 6 from a pressure source (not shown). When the distance X between the deflection plate 5 and the measuring nozzle 2 changes, the pressure value $p_2$ measured by the pressure sensor 4 changes. The distance X is determined from this while taking into account the pressure value $p_1$ measured by the first pressure sensor 3.

Figure 2:
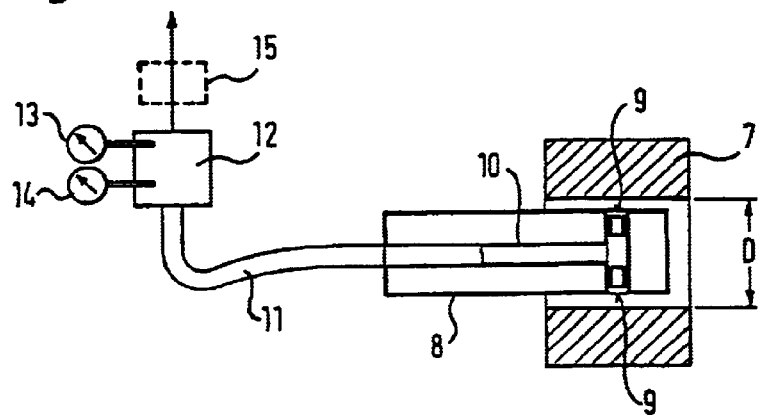
FIG. 2 the use of such a measuring arrangement with a compensation apparatus in accordance with the invention.

FIG. 2 shows the application of the principle described with reference to FIG. 1 for the measurement of the interior diameter D of a hollow article 7. A measuring head 8 includes two air outlet openings 9 which are disposed on opposite side and which are connected to a pressure line 11 connected to the measuring head 8 via a pressure passage 10. The pressure line 11 is connected at the other end to a transducer 12 in which the front nozzle and the two pressure sensors 13 and 14 are accommodated and which is connected to a pressure source. The signal output of the transducer 12 is connected to a compensation apparatus 15 in accordance with the invention whose output in turn makes available the end signal. An increase in the diameter D results in a fall in the measured pressure $p_2$ and vice versa.

Figure 4:
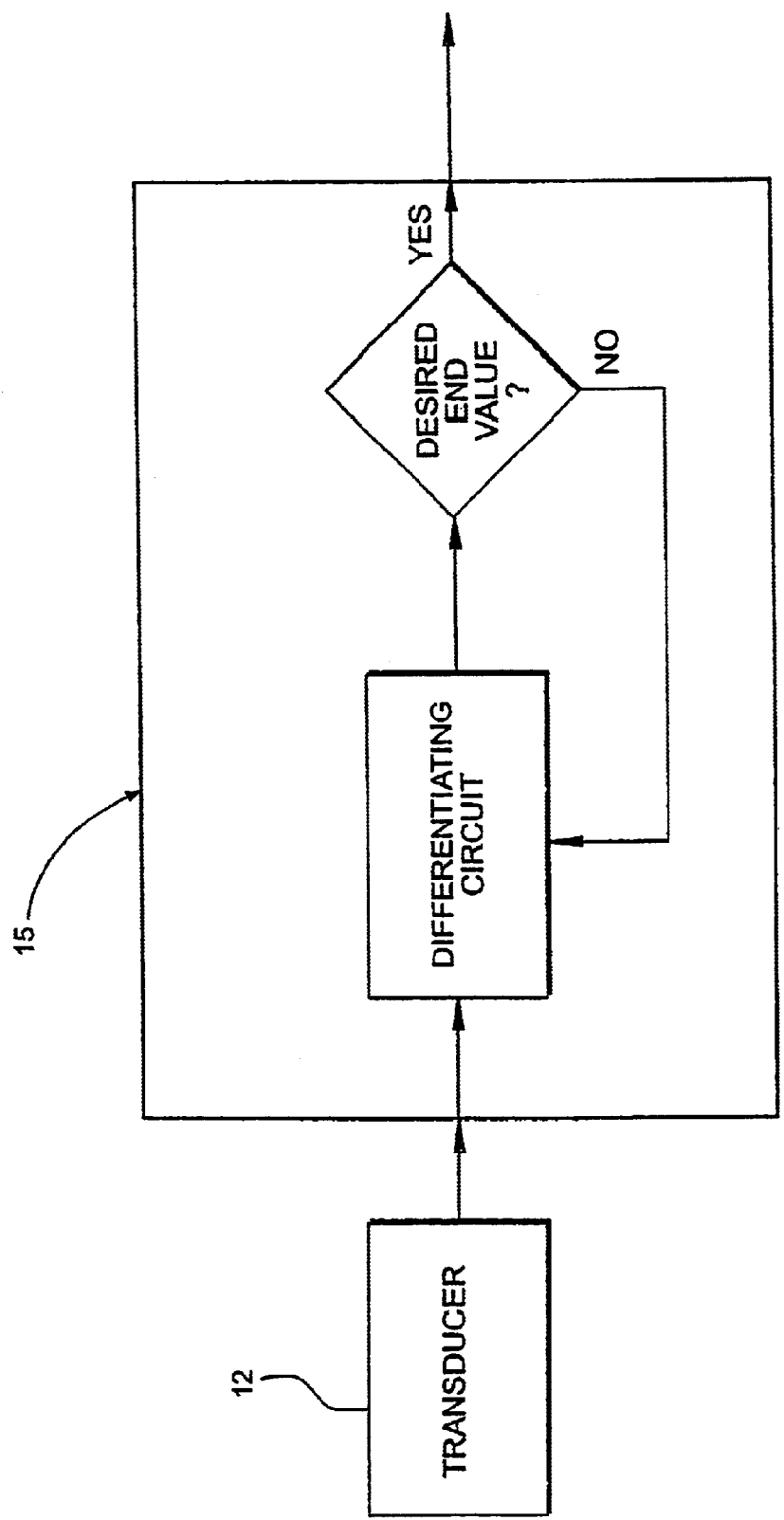
FIG. 4 is a block diagrammatic illustration of signal flow from the transducer through the compensating apparatus.

As best illustrated in FIG. 4, the compensation apparatus in particular includes a circuit with which the compensation function, which, in accordance with the invention, is a differential equation of the first order, is realized and means to apply the compensation function a plurality of times to an output signal delivered by the transducer 12. This means the differential equation fixed in the circuit is applied to the signal delivered by the transducer 12 and this differential equation is again applied to the signal resulting therefrom, and so on, until a desired acceleration is achieved or a previously fixed number of such correction steps has been absolved.

The correction function fixed in the circuit can have the following form, for example:

$$S'(t) = S(t) + k \times \frac{dS(t)}{dt},$$

where S(t) is the value to be modified, S'(t) is the modified value and k is a constant. A separate constant k is preferably fixed for each correction step in this connection, with these constants k being able to be determined either by trials or automatically for the respective arrangement. In this connection, the constants k are determined such that only a few correction steps are needed. In a high pressure measuring process of the previously described kind, good acceleration values were able to be achieved with four correction steps and suitable constants k.

Figure 3:
FIGS. 3*a* and 3*b* provide a comparison of the compensated and noncompensated measured values of such an arrangement, respectively.
Figure 3:

FIGS. 3*a* and 3*b* show measurements of the interior diameter D of the article 7 carried out with the apparatus of FIG. 2. For this purpose, the measuring head 8 was moved into the article 7 and back out again five times at different speeds. The hose length during the carrying out of the measurement was 1.5 m. The transducer was statically adjusted to zero for the nominal diameter D before the measurement.

FIG. 3*a* shows the measuring result when using the compensation apparatus in accordance with the invention and FIG. 3*b* without compensation. It can clearly be recognized that the measured value is reached much faster with the compensation in accordance with the invention than without. It can also be recognized that with very short measurements, the measured value is still reached with the compensation in accordance with the invention, while this is no longer the case without compensation.

As represented and stated, a substantial acceleration of the measurement is achieved by the method in accordance with the invention and by the apparatus in accordance with the invention. Fast, dynamic measurements can thus be carried out. The compensation is uncomplicated due to the compensation method in accordance with the invention and can be realized with comparatively simple circuits.

REFERENCE NUMERAL LIST

| | |
|---|---|
| 1 | front nozzle |
| 2 | measuring nozzle |
| 3 | first pressure sensor |
| 4 | second pressure sensor |
| 5 | deflection plate |
| 6 | arrow |
| 7 | article |
| 8 | measuring head |
| 9 | air outlet opening |
| 10 | air passage |
| 11 | air line |
| 12 | transducer |
| 13 | first pressure sensor |
| 14 | second pressure sensor |
| 15 | compensation apparatus |
| X | distance |
| D | diameter |

What is claimed is:

1. A method for compensating the transmission behavior of a measuring, regulating or control arrangement, in particular of a dynamic length measuring arrangement in accordance with a high pressure measurement method, said compensating method comprising the steps of:

determining a correction function for associated input values of the arrangement in accordance with the transmission behavior of the arrangement wherein said correction function is a linear differential equation of the first order; and reiteratively modifying output values from the arrangement by the correction function a plurality of times in succession to obtain an end value.

2. A method in accordance with claim 1, characterized in that the repeatedly applied correction function has the following form:

$$S'(t) = S(t) + k \times \frac{dS(t)}{dt},$$

where S(t) is the value to be modified, S'(t) is the modified value and k is a constant.

3. A method in accordance with claim 2, characterized in that a separate constant k is fixed for each correction step.

4. A method in accordance with claim 3, characterized in that the constants k are determined such that as few corrections steps as possible are needed for the desired correction.

5. A method in accordance with claim 3, characterized in that suitable constants k for the correction steps are determined by trials.

6. A method in accordance with claim 3, characterized in that suitable constants k for the correction steps are determined automatically.

7. A method in accordance with claim 1, characterized in that the modified values are directed through an attenuation member, in particular a low pass filter, in the last correction step.

8. A method in accordance with claim 7, characterized in that the end value of the correction is averaged over a time interval.

9. A method in accordance with claim 8, characterized in that the averaging of the end value is started after a fixable start-up time.

10. A method in accordance with claim 9, characterized in that the averaging is started in response to a start signal deliverable to the system from the outside.

11. An apparatus for compensating the transmission behavior of a measuring, regulating or control arrangement, in particular of a dynamic length measuring arrangement in accordance with a high pressure measurement method, said apparatus comprising:

means for modifying output values of the arrangement by a correction function wherein said correction function is determined for the associated input values in accordance with the transmission behavior of the arrangement, and wherein said means for modifying the output values are designed such that a linear differential equation of the first order is used as the correction function, and wherein the output values are reiteratively modified by said correction function a plurality of times in succession to obtain an end value.

12. An apparatus in accordance with claim 11, characterized in that an attenuation member, in particular a low pass filter is provided, through which the modified values can be directed.

13. An apparatus in accordance with claim 11, characterized in that means are provided for averaging the modified value.

14. An apparatus in accordance with claim 11, characterized in that means for outputting the end value are provided.

15. An apparatus in accordance with claim 11, characterized in that the number of the correction steps is adjustable.

16. An apparatus in accordance with claim 13, characterized in that the starting point in time of the averaging is adjustable.

17. An apparatus in accordance with claim 12, characterized in that the magnitude of the attenuation, in particular the limit value of the low pass filter, is pre-settable.

18. Use of the method in accordance with claim 1 for the length measurement in accordance with the high pressure measurement method, in particular while using an apparatus having a front nozzle (1) and a measuring nozzle (2), having a first pressure sensor (3) in front of the front nozzle (1) and having a second pressure sensor (4) between the front nozzle (1) and the measuring nozzle (2).

19. Use of a method in accordance with claim 11 for the length measurement in accordance with the high pressure measurement method, in particular while using an apparatus having a front nozzle (1) a measuring nozzle (2), a first pressure sensor (3) in front of the front nozzle (1) and a second pressure sensor (4) between the front nozzle (1) and the measuring nozzle (2).

* * * * *